Feb. 22, 1966 A. W. YOUNG 3,236,516
CLAMP OR VICE
Filed Jan. 30, 1964
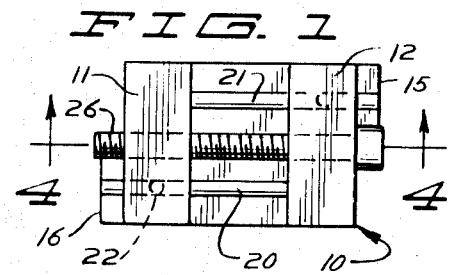
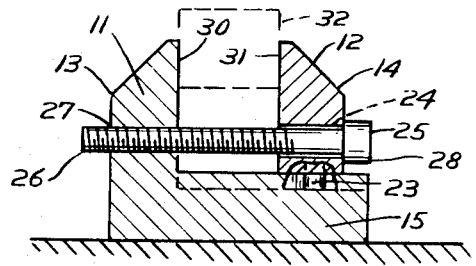
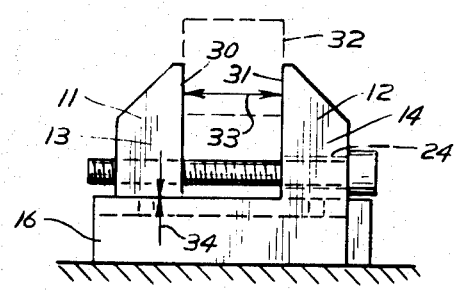
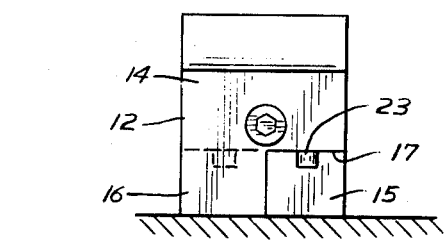
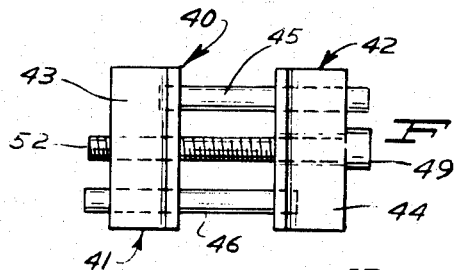
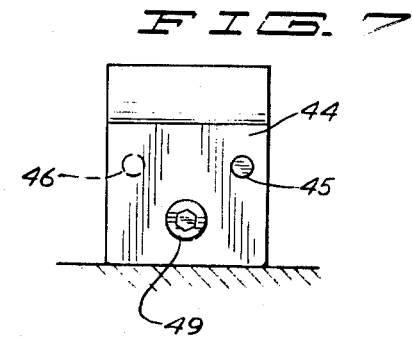
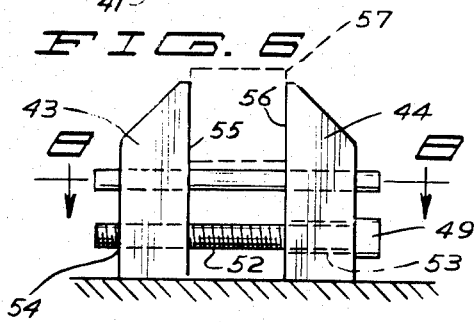
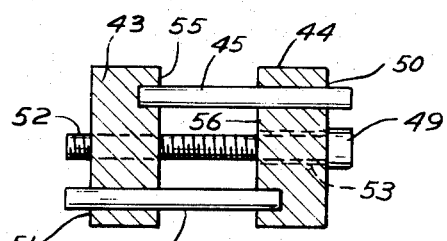
INVENTOR.
ALBERT W. YOUNG
BY
Dugger Braddock Johnson & Westman
ATTORNEYS United States Patent Office 3,236,516
Patented Feb. 22, 1966

3,236,516
CLAMP OR VICE
Albert W. Young, 2014 E. Lafayette Place,
Milwaukee, Wis.
Filed Jan. 30, 1964, Ser. No. 341,175
3 Claims. (Cl. 269—252)

The present invention has relation to a clamp or vice constructed so that any forces on the jaws thereof which tend to move the jaws out of their original position are transferred to the other jaw so that the loads on the jaws are equalized.

Model makers, jewelers, and other people working with small precision parts have long needed clamps or vices wherein the jaws will stay in required position even if they are unequally loaded. In the usual case the jaws will cock causing unequal pressure to be placed on the item being held and thereby causing misalignment, misfit and malfunction.

The present invention presents a jaw clamp or vice wherein the unit is constructed so that loads on one of the jaws are counter balanced by the other jaw thereby causing the jaws to remain in position throughout their entire travel and regardless of the eccentricity of the load application.

Two forms of the invention are shown, each of which comprises a pair of jaw members having integral or fixedly attached projections which are slidable with respect to the other jaw.

It is an object of the present invention to present a clamp or vice wherein the forces on one of the jaws are transferred to the other jaw in a symmetrical relationship.

In the drawings,

FIG. 1 is a top plan view of a clamp or vice made according to the present invention;

FIG. 2 is a side elevational view of the device of FIG. 1;

FIG. 3 is an end elevational view of the device of FIG. 1;

FIG. 4 is a sectional view taken as on line 4—4 in FIG. 1;

FIG. 5 is a top plan view of a clamp or vice made according to a second form of the present invention;

FIG. 6 is a side elevational view of the device of FIG. 5;

FIG. 7 is an end elevational view of the device of FIG. 5; and

FIG. 8 is a sectional view taken on line 8—8 in FIG. 6.

Referring to FIGS. 1 through 4 and the first form of the invention illustrated therein, a jaw clamp or vice illustrated generally at 10 includes a pair of substantially identical jaw members 11 and 12, respectively. The jaw members include upright portions or members 13 and 14, respectively, and each upright portion has an integral leg or support member 15 and 16, respectively, situated at right angles to the upright members 13 and 14 and extending toward the other jaw member of the pair. The legs are less than one half the width of the upright members and are positioned completely to one side of the vertical centerline of the upright members.

Each of the jaw members has a cut away portion 17 which is of size to receive the leg of the other jaw member. The cut away portions 17 are alongside the leg of the jaw members which in turn are below the upright member 14. The leg of a first jaw member slides through the cut away portion of the second jaw member and vice versa.

Each of the legs 15 and 16, respectively, has a longitudinal groove 20 and 21 defined therein. Each of the upright members 13 and 14 have a separate pin 22 and 23 respectively, mounted so as to align with and fit within the groove on the leg of the other jaw member. The pins 22 and 23 depend from the upright members 13 and 14 and protrude into the cut away portions 17.

The only difference between the two jaw members is that the second jaw member 12 has an opening 24 defined therethrough and through which a screw or bolt 25 is slidably mounted. The first jaw member 11 has an opening 27 that is threaded in the inner surfaces thereof and bolt 26 is threadable mounted through this opening. The bolt 26 has a head member 28 which bears against the outer surface of the second jaw member 12 and when the bolt is threaded through opening 27 can be used to move the jaws 11 and 12, respectively, toward each other.

It is apparent that a bolt and nut, toggle, cam or other device can be used for controlling movement of the jaw members.

The upright members 13 and 14 have facing clamping surfaces 30 and 31 respectively, between which articles, for example, a block illustrated in dotted lines at 32 can be placed. When an article is placed between the jaw members and the bolt 25 is tightened, the clamping forces will act against surfaces 30 and 31 as indicated by arrow 33. If there is any tendency to cock or come out of parallel relationship the loads against surfaces 30 and 31 will be transferred through the upright member, for example, through member 14 and its attached leg 16 to the upright member 13 as shown by arrow 34. Also load will be transferred directly from the upright member 14 to the end of leg 15 of the opposite jaw. The horizontal upper surfaces of the legs transfer load to mating horizontal lower surfaces of the other jaw member.

If the object being clamped between the jaws is positioned adjacent one edge of the jaws or, in other words, asymmetrical with respect to the vertical axis of the clamp, the tendency of the jaws to cock will be resisted by the pegs 22 and 23 respectively, acting against the side edge surfaces of the slots 20 and 21 in which they are slidably mounted, and by contiguous, facing vertical side surfaces of each of said legs. The jaws will not be permitted to cock and will remain in their original position.

It will be noted that each time there is a force against one of the jaws tending to cock it with respect to the other, this force is transmitted through the legs 15 or 16 to the other jaw through their mating surfaces. If the endency is to cock in a transverse direction the pins 22 and 23, acting through the surfaces defining their respective slots, will transfer these forces to the other jaw. Thus the jaws stay in their original relationship throughout their entire travel regardless of the load on them, within the load limits of the clamp.

The pins 22 and 23 are illustrated to show one type of structure to prevent transverse cocking of the jaws, other devices can be used, as long as the load from one jaw is balanced against the other jaw.

*Second form of invention*

Referring specifically to FIGS. 5 through 8 and a second form of the present invention illustrated therein, a parallel jaw clamp or vice is made up of two identical jaw members 41 and 42, respectively, which are slidably mounted with respect to each other. Each of the jaw members 41 and 42 comprises an upright member 43 and 44 respectively, and each of the upright members mounts a fixedly attached outwardly extending pin 45 and 46, respectively. The pins 45 and 46 are monuted within provided receptacles within their associated upright members and are either pressed into the receptacles or fixed in some other convenient manner.

Pin 45 is slidably mounted through a provided hole 50 in upright member 44 and pin 46 is slidably mounted through a provided hole 51 in upright member 43. The pins are slidably fitted within their provided holes so that they will not individually cock and bind against the surfaces defining the hole.

A bolt or screw 52 is slidably mounted through a provided hole 53 in upright member 44 and is threadably mounted as at 54 in the upright member 43. The bolt 52 has a head 55 which bears against the outer surface of member 44 and by threading the bolt with respect to member 43, the two upright members can be freely moved away from each other.

The upright members 43 and 44 have clamping surfaces 55 and 56, respectively, between which an object, illustrated in dotted lines at 57 can be clamped. The loads against surfaces 55 and 56 are controlled by the bolt or screw 52. Any tendency of one of the members to cock with respect to the other is transferred through the sliding pins 45 and 46 to the other member. The loads tending to cock the jaws about an upright axis are also transferred through the pins to the other jaw. In this way any loads on one of the jaws is transferred to the other jaw and the loads are balanced. Thus the surfaces 55 and 56 will remain in position throughout the entire travel of the two jaws within the capacity of the clamp. When an object is to be released the bolt is merely loosened and the jaws separate.

The clamp will hold objects in their original position. Load on one jaw is transferred and balanced by the other. Both forms of the invention can also be used as spreaders or expanders by proper orientation of the mechanism controlling jaw movement. The loads on one jaw would still be balanced by the other.

It is apparent that many widely differing embodiments of the invention can be made and applicant is limited only by the scope of the claims which are appended hereto.

What is claimed is:

1. A clamp comprising a pair of substantially identical jaw members, each of said jaw members including an upright member having an upper clamping portion having a clamping surface facing the clamping surface of the other jaw member, each of said upright members having an integral leg of rectangular cross section extending outwardly therefrom at substantially right angles to the clamping surface, each leg having a transverse width of less than one-half the width of the upright member and having a horizontal upper surface which slidably engages a horizontal lower surface on the upright member of the other jaw member, and means for moving said jaw members with respect to each other.

2. A vice comprising a pair of jaw members, said jaw members having facing clamping surfaces, a separate leg member mounted onto each of said jaw members and slidably mounted with respect to the other jaw member, said leg members each having an upwardly facing surface which slidably engages a downwardly facing surface on the opposite jaw member, each of said leg members having a longitudinally extending slot provided therein and each jaw member having a separate depending peg of size to snugly slidably fit the slot in the leg of the other member, and means for moving said jaw members with respect to each other.

3. The combination as specified in claim 1 wherein each of said legs of rectangular cross section have a vertical side surface which slidably engages the vertical side surface of the other leg.

References Cited by the Examiner
UNITED STATES PATENTS

| 703,898 | 7/1902 | Davison | 81—165 |
| 2,170,535 | 8/1939 | Marsden | 269—253 X |

WILLIAM W. DYER, Jr., *Primary Examiner.*

ROBERT C. RIORDON, *Examiner.*